(12) United States Patent
Silberzahn et al.

(10) Patent No.: US 11,647,348 B2
(45) Date of Patent: May 9, 2023

(54) PREPARATION DEVICE AND SYSTEM FOR IN-SITU CUSTOMIZATION OF AN EARPIECE

(71) Applicant: SONOVA AG, Staefa (CH)

(72) Inventors: Konstantin Silberzahn, Meilen (CH); Julia Lonsky, Zürich (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 17/416,485

(22) PCT Filed: Dec. 21, 2018

(86) PCT No.: PCT/EP2018/086676
§ 371 (c)(1),
(2) Date: Jun. 19, 2021

(87) PCT Pub. No.: WO2020/083517
PCT Pub. Date: Apr. 30, 2020

(65) Prior Publication Data
US 2022/0046371 A1 Feb. 10, 2022

(51) Int. Cl.
*H04R 1/10* (2006.01)
*H04R 25/00* (2006.01)
*B29B 13/02* (2006.01)

(52) U.S. Cl.
CPC ......... *H04R 25/659* (2019.05); *B29B 13/023* (2013.01); *H04R 25/30* (2013.01); *H04R 25/609* (2019.05); *H04R 25/554* (2013.01); *H04R 2225/0216* (2019.05)

(58) Field of Classification Search
CPC ...... H04R 25/659; H04R 25/652; F27B 17/02
See application file for complete search history.

(56) References Cited

U.S. PATENT DOCUMENTS

| | | | | |
|---|---|---|---|---|
| 3,644,708 A | * | 2/1972 | Edwards | B29B 13/023 219/465.1 |
| 4,407,651 A | * | 10/1983 | Beck | F27B 9/062 219/601 |
| 9,179,211 B2 | * | 11/2015 | Kirkpatrick | H04R 1/1016 |
| 10,623,861 B2 | * | 4/2020 | Prevoir | C08G 65/34 |
| 10,805,747 B2 | * | 10/2020 | Thumm | H04R 25/659 |

(Continued)

FOREIGN PATENT DOCUMENTS

| | | | | |
|---|---|---|---|---|
| DE | 4233651 A1 | * | 4/1994 | H04R 25/656 |
| DE | 102006047664 A1 | * | 4/2008 | F26B 23/06 |

(Continued)

OTHER PUBLICATIONS

International Search Report and Written Opinion received in International Application No. PCT/EP2018/086676.

(Continued)

*Primary Examiner* — Ryan Robinson
(74) *Attorney, Agent, or Firm* — ALG Intellectual Property, LLC (57) ABSTRACT

The disclosure relates to a device for preparing an earpiece for its customization, the device including an energy release unit comprising a receiving chamber for receiving the earpiece and configured to release energy into the receiving chamber. The disclosure further relates to a system for customizing an earpiece comprising the earpiece and the preparing device.

19 Claims, 5 Drawing Sheets

(56) References Cited

U.S. PATENT DOCUMENTS

| | | | |
|---|---|---|---|
| 2010/0086160 A1* | 4/2010 | Beck | H04R 25/659 |
| | | | 381/322 |
| 2012/0068379 A1* | 3/2012 | Klemenz | H04R 25/652 |
| | | | 249/55 |
| 2016/0045373 A1 | 2/2016 | Williams | |
| 2016/0165367 A1 | 6/2016 | Ochsenbein | |
| 2019/0215627 A1* | 7/2019 | Brenner | H04R 25/652 |
| 2020/0407554 A1* | 12/2020 | Weder | H04R 31/00 |
| 2021/0315740 A1* | 10/2021 | Lonsky | H04R 25/652 |
| 2022/0159362 A1* | 5/2022 | Kirkpatrick | H04R 1/1016 |

FOREIGN PATENT DOCUMENTS

| | | | | |
|---|---|---|---|---|
| DE | 102012218663 A1 * | 4/2014 | | H02J 7/0044 |
| GB | 2504303 | 1/2014 | | |
| WO | WO-2010000028 A1 * | 1/2010 | | H04R 25/658 |

OTHER PUBLICATIONS

Electrolux, et al., Frigidaire Professional 30" Built-In Convection Microwave Oven with Drop-Down Door Manual, ISBN: 978-1-5104-0185-3 http://manuals.frigidaire.com/prodinfopdf/Specsheets/FPM03077T_1017_EN.pdf (retrieved Nov. 7, 2018).

* cited by examiner

PREPARATION DEVICE AND SYSTEM FOR IN-SITU CUSTOMIZATION OF AN EARPIECE

TECHNICAL FIELD

This disclosure generally relates to a device for preparing an earpiece for its customization at an ear, more specifically for preparing an earpiece that can be at least partially inserted into an ear canal for its customization to an ear shape. The invention also relates to a system for customizing an earpiece at an ear.

BACKGROUND OF INVENTION

Earpieces can be employed as earplugs offering protection for the ear, for instance against undesired noises and/or against harmful substances entering the ear such as water and/or dirt. Earpieces can also be applied for hearing devices, in particular for positioning at least a component of the hearing device at a region of the ear. Hearing devices may be used to improve the hearing capability or communication capability of a user, for instance by compensating a hearing loss of a hearing-impaired user, in which case the hearing device is commonly referred to as a hearing instrument such as a hearing aid, or hearing prosthesis. A hearing device may also be used to produce a sound in a user's ear canal. Sound may be communicated by a wire or wirelessly to a hearing device, which may reproduce the sound in the user's ear canal. For example, earpieces such as earbuds, earphones or the like may be used to generate sound in a person's ear canal. Furthermore, hearing devices may be employed as hearing protection devices that suppress or at least substantially attenuate loud sounds and noises that could harm or even damage the user's sense of hearing. Hearing devices are often employed in conjunction with communication devices, such as smartphones, for instance when listening to sound data processed by the communication device and/or during a phone conversation operated by the communication device. More recently, communication devices have been integrated with hearing devices such that the hearing devices at least partially comprise the functionality of those communication devices. Hearing devices include, for instance, earbuds, earphones, and hearing instruments such as behind-the-ear (BTE) hearing aids, receiver-in-the-canal (RIC) hearing aids, in-the-ear (ITE) hearing aids, invisible-in-the-canal (IIC) hearing aids, and completely-in-the-canal (CIC) hearing aids.

Earpieces for hearing devices have long been provided either in an universal size or in a number of sizes from which a user may choose from, or they have been custom-printed in three dimensions or custom-molded and hardened after a curing process. The latter process can account for an improved fit of the earpiece inside the ear and an increased wearing comfort. But this can only be achieved after a rather time-consuming and expensive customization procedure carried out by a health care professional (HCP). In more recent times, earpieces have been proposed that can be customized to an ear shape more easily during direct application of the earpiece at the ear. Typically, those earpieces can be transformed from a first state into a second state after energy has been supplied to the earpiece, wherein the earpiece is deformable in the second state and non-deformable in the first state during application of the earpiece at an ear. Thus, when the earpiece is provided in the second state, an in-situ customization of the earpiece can be carried out on-site directly at an ear of a user. Such an in-situ customization can be carried out by the HCP requiring less effort since the initial preparation of the custom-mold and a possibly required further reworking process of the earpiece can be omitted. More ideally still, the on-site customization would be executed without the need of assistance of an HCP, in particular a person without specific background knowledge such as a salesperson and/or the user of the hearing device himself.

Various in-situ customizable earpieces have been proposed. They have in common that the earpiece consists of a material that changes its state of rigidity from a relatively soft first state, where it easily adapts to a required ear geometry, to a relatively hard second state for a permanent fixation of the pre-formed geometry. The material needs to be prepared in order to switch between the soft and the hard state rather quick and upon a well-defined trigger mechanism. For instance, the trigger mechanism of the material can be provided as light energy, in particular by photons of a particular frequency at a certain intensity, as disclosed in international patent application publication Nos. WO 2015/179975 A1 and WO 2017/184929 A1. The trigger mechanism of the material can also be provided in the form of thermal energy. In particular, international patent application publication No. WO 2008/070986 A1 discloses an earpiece formed by two silicone materials which harden when mixed after a curing process. Such a curing process can be assisted by thermal energy. U.S. patent application publication No. US 2017/0223444 A1 discloses an earpiece formed from a bulk thermoplastic material that can be provided in a moldable condition after heating to a transition temperature and hardens after cooling. International patent application publication No. WO 2018/099562 A1 discloses a shape memory material forming the earpiece such that heating the earpiece beyond a transition temperature can evoke a malleable state in which the earpiece is customizable at and ear and subsequent cooling below the transition temperature provides the earpiece in a hardened customized shape. International patent application No. PCT/EP2018/072428 discloses an earpiece comprising a core material enclosed by an elastic sleeve, wherein heating the core material above a transition temperature provides the earpiece in a malleable state allowing its in-situ customization and subsequent cooling leads to a hardened state in which the earpiece is ready for use in its customized shape.

Thus, a preparation of the earpiece for evoking the trigger mechanism required for the in-situ customization frequently relies on an energy to be supplied to the earpiece. The process of supplying energy to the earpiece, however, often demands fairly special conditions to be fulfilled such as a specific amount of energy to be supplied to the earpiece for a certain period of time. Ideally, the supplied energy would be homogeneously distributed over the earpiece during the preparation process to ensure a faultless and reproducible customization functionality of the earpiece. But the earpiece can be rather difficult to handle during such a preparation due to its rather small size and/or an unfavorable shape making it hard to get sufficient grip for a preparation manipulation. Those difficulties are enhanced when desirable hygienical preconditions shall be met during the preparation. Hence, despite an enormous facilitation of in-situ customization as compared to the previously known multi-step fabrication methods of an earpiece, an adequate preparation of the earpiece for the in-situ customization may still not represent an unproblematic task, even when carried out by an HCP. Those problems can be aggravated when the in-situ customization and according earpiece preparation is carried out by another person, in particular a salesperson and/or the user of the earpiece himself. Moreover, earpieces are often used while the user is on the move or away from home, for instance at work or during travelling. In consequence, the possibility of a mobile in-situ customization and an according preparation of the earpiece would be desirable. Yet suitable arrangements allowing preparation of the earpiece on the go are not publicly available. In addition, the above described difficulties of handling the earpiece during preparation can be enhanced when encountered away from home.

SUMMARY

It is an object of the present disclosure to avoid at least one of the above mentioned disadvantages and to provide a device for preparing an earpiece for in-situ customization at an ear in a reliable and/or reproducible manner. It is another object to provide a device allowing an earpiece in-situ customization preparation in different and/or changing environments, in particular when traveling or commuting between different places. It is a further object to provide a device facilitating and/or automatizing an earpiece in-situ customization preparation, in particular such that a person without prior knowledge such as a salesperson and/or the user of the earpiece can be enabled to easily perform the preparation. It is another object to provide a device for customization preparation of an earpiece connected to and/or integrated with a hearing device, in particular such that certain functionalities of the hearing device are not compromised during the earpiece preparation. It is yet another object to provide a device for earpiece customization preparation in a rather compact format, in particular allowing rather effortless carrying and/or storing of the device. It is a further object to provide a device for transferring energy to an earpiece in a secure way, in particular such that a user can be kept safe during the energy transfer and/or such that hygienic standards can be met. It is another object to provide a system comprising an earpiece and a device for its customization preparation having at least one of the above mentioned benefits.

At least one of these objects is achieved by a device comprising the features described herein and/or a system comprising the features described herein.

Accordingly, the disclosure proposes a device for preparing an earpiece for its customization. The device includes an energy release unit comprising a receiving chamber for receiving the earpiece. The energy release unit is configured to release energy into the receiving chamber. The device further comprises a controller configured to control the energy releasing of the energy release unit. The energy releasing is controlled in such a manner that a predetermined amount of energy can be supplied to the earpiece inside the receiving chamber. In this way, predetermined energy release conditions can be provided at the energy release unit controlled by the controller such that an energy supplied to the earpiece in the receiving chamber can be provided in a reproducible and/or optimized and/or user-friendly manner. The device can thus account for a facilitated and/or more precise earpiece customization preparation.

A system for customizing an earpiece according to the disclosure comprises the earpiece and a device for its customization preparation. The earpiece is configured to transform from a first state into a second state after energy has been supplied to the earpiece. The earpiece is deformable in the second state and non-deformable in the first state during application of the earpiece at an ear. The system can provide improved customization of an earpiece to a specific ear geometry, in particular a facilitated and/or more reliable earpiece customization, by enabling an advantageous customization preparation process of the earpiece by means of the customization preparation device.

Aspects regarding some implementations of the device for earpiece customization preparation as further detailed in the subsequent description may be correspondingly applied in some implementations of the earpiece customization system. Aspects regarding some implementations of the earpiece customization system as further detailed in the subsequent description may be correspondingly applied in some implementations of the device for earpiece customization preparation.

In some implementations, the device for preparing an earpiece for its customization comprises a casing. The casing can include a base and a cover. The casing can enclose an inner space between the base and the cover. The energy release unit can be provided in the inner space. Such a casing can have advantages in many aspects. In particular, the cover can be configured to provide a shielding of the energy release unit from an ambient environment outside the inner space. In this way, the customization preparation can be performed by a user in a more secure way. For instance, the cover can be configured to at least partially isolate the energy produced and/or released from the energy release unit from an ambient environment outside the inner space. In particular, the casing can be configured to be portable by a user. In particular, the casing can be configured to be positioned on a ground plane. In this way, the device can be used quickly and flexibly in various places and/or occasions. The casing can be displaceable on a ground plane, in particular with the base positioned on the ground plane.

In some implementations, the cover comprises an opening exposing the receiving chamber. The cover can thus be configured such that the earpiece is insertable into the receiving chamber through the opening of the cover. This can improve an ease of use of the device by allowing a simple access to the receiving chamber, in particular an easy insertion and/or removal of the earpiece from the receiving chamber. In particular, the opening can be provided at a top wall of the cover. The top wall can be in spaced relation to the base.

In some implementations, the device for preparing an earpiece for its customization comprises a deposition area. The deposition area can be configured to support a hearing device. In particular, an earpiece to be prepared for customization can be connected to the hearing device. The deposition area can be provided on the cover, in particular at a top wall of the cover. The cover can comprise an indentation comprising the deposition area. This can allow an easy deposition and/or removal of the hearing device from the deposition area, in particular by also providing for an at least slight fixation of the hearing device on the deposition area. In particular, the indentation can be substantially kidney-shaped. Thus, a rather easy access to the hearing device can be provided at the deposition area. In some implementations, the device comprises two deposition areas. The deposition areas can be spaced from one another at the cover. The deposition areas can be each provided in a respective indentation on the cover. in particular at a top wall of the cover. This can allow to deposit two hearing devices simultaneously on the device. The deposition areas can be provided in a symmetrical arrangement on the cover. This can allow an easy access to both hearing devices at the deposition areas, in particular by using two hands simultaneously.

In some implementations, the device for preparing an earpiece for its customization comprises a charging port for a hearing device. The charging port can be configured to provide a connection to a power supply for a hearing device at the deposition area. In particular, the charging port can be provided such that it is connectable to the hearing device at the deposition area. In this way, various functionalities can be provided by the device, in particular to reduce an amount of additional equipment required for the hearing device. In some implementations, the charging port comprises a connector for the hearing device. The connector can be configured to be connected to a power source. In this way, a wired charging of the hearing device can be provided on the deposition area. In some implementations, the charging port is configured for wireless charging. In particular, the charging port can comprise an induction coil. The induction coil can be configured to be connected to a power source. In some implementations, the controller is operationally connected to the charging port. In particular, the controller can also be connectable to a power source.

In some implementations, the device for preparing an earpiece for its customization comprises a data port for a hearing device. The data port can be provided such that it is connectable to the hearing device at the deposition area. In some implementations, the data port comprises a connector for the hearing device. The connector can be configured to be connected to a data interface, in particular a data interface of an external device. In particular, the data port can comprise a bus, for instance a universal serial bus (USB) and/or the like. In some implementations, the data port comprises an antenna configured for wireless communication with the hearing device. In particular, the antenna can be operative to be compliant with a Bluetooth standard and/or the like. In some implementations, the controller is operationally connected to the data port. In particular, the controller can also be configured to provide for data communication with an external device.

In some implementations, the device for preparing an earpiece for its customization comprises a user interface. The user interface can be configured to detect a user interaction. The controller can be operationally connected to the user interface. The user interface can be provided on the cover. The controller can be configured to initiate the controlling of the energy releasing after the user interaction has been detected. In this way, a user-friendly operation of the device can be provided. In some implementations, the user interface is configured to detect a manual impact by a user. In particular, the user interface can comprise a push button and/or a switch. In some implementations, the user interface is configured to detect a voice of a user. For instance, the user interface can be configured to recognize a voice command such as "start preparation" and/or "turn on/off". In this way, an uncomplicated operation of the device can be provided even for a rather inexperienced user. In some implementations, the user interface can comprise a programming interface for the controller. For instance, the controller can be programmable to control the earpiece preparation at a certain daytime.

In some implementations, the device for preparing an earpiece for its customization comprises a detector for identifying a hearing device disposed on the deposition area. The detector can comprise a data port for the hearing device, in particular a data port connectable to the hearing device at the deposition area. The detection of the hearing device can be performed based on determining whether a data connection has been established by the data port, for instance whether a Bluetooth connection has been established with the hearing device. The controller can be configured to control the earpiece preparation depending on a hearing device detected to be disposed on the deposition area. In some implementations, the device for preparing an earpiece for its customization comprises a detector for identifying an earpiece inserted into the receiving chamber and/or an empty receiving chamber. In particular, the detector can comprise an optical sensor configured to monitor the receiving chamber. In particular, the detector can comprise an RFID reader configured to detect an RFID tag. The RFID tag can be provided on the earpiece and/or the hearing device. The controller can be configured to control the earpiece preparation depending on an earpiece inserted into the receiving chamber and/or an empty receiving chamber.

In some implementations, the device for preparing an earpiece for its customization comprises an output interface. The output interface can be configured to output information indicative of at least one parameter related to the energy releasing by the energy release unit. The output interface can be provided on the cover. The controller can be operationally connected to the output interface. The controller can be configured to initiate the outputting. In some implementations, the output interface comprises a light emitting diode (LED). In this way, a readily apparent and easily identifiable recognition of the output information for a user can be provided. In some implementations, the output interface comprises a display. The display can be configured to visualize the output information, in particular in the form of a text and/or numbers. In some implementations, the parameter comprises an indication whether the predetermined amount of energy has been supplied to the earpiece inside the receiving chamber. In some implementations, the controller is configured to initiate outputting of the information by the output interface after determining that an elapsed time during which the energy has been released by the energy release unit has exceeded a predetermined time interval.

In some implementations, the device for preparing an earpiece for its customization comprises an energy detector. The energy detector can be configured to determine a quantity indicative for the energy released by the energy release unit. The energy detector can be operatively connected to the controller. The energy detector can be provided at the energy release unit. The energy detector can comprise a temperature sensor.

In some implementations, the receiving chamber has a substantially cylindrical shape, in particular a circular cylindrical shape. In some implementations, the receiving chamber has a substantially dome-like shape, in particular substantially a shape of a paraboloid. In this way, the receiving chamber can be advantageously adapted to the shape of an earpiece. In some implementations, the energy supply unit comprises a contact wall for contacting the earpiece. The contact wall can at least partially delimit the receiving chamber. The energy release unit can thus be configured to supply the energy to the earpiece at the contact wall.

In this way, an efficient and reliable energy transfer can be provided. The device for preparing an earpiece for its customization can further comprise a removable insert. The removable insert can be configured to be inserted into the energy release unit. The contact wall can be provided on the insert. The energy can be released by the energy release unit through the insert. The removable insert can provide a protection of the hearing device, in particular with respect to sanitary aspects.

In some implementations, the receiving chamber is a first receiving chamber for receiving a first earpiece, wherein the energy release unit comprises a second receiving chamber for receiving a second earpiece. In this way, a simultaneous preparation of the two earpieces can be provided. The energy release unit can be configured to release energy into each receiving chamber. In some implementations, the two receiving chambers are substantially identical. In some implementations, the two receiving chambers comprise a different size and/or shape. In this way, the device can be optimized for a preparation of earpieces of different sizes and/or shapes.

In some implementations, the energy release unit is configured such that the predetermined amount of energy is selected such that the earpiece can be transformed from a first state into a second state inside the receiving chamber, wherein the earpiece is non-deformable in the first state and deformable in the second state during application of the earpiece at an ear. In some implementations, the controller is configured to control the energy releasing such that energy at a substantially constant energy level is released into the receiving chamber, at least for a predetermined time interval. The predetermined time interval can be selected to correspond to the predetermined amount of energy to be supplied to the earpiece. The controlling of the substantially constant energy level by the controller can be based on the determining by the energy detector of the quantity indicative for the energy released by the energy release unit. In some implementations, the controller is configured to control the energy release unit to release the energy at a first energy level and subsequently at a second energy level. The first energy level can have a larger value than the second energy level. In this way, a more efficient energy supply corresponding to the first energy level can be provided at first. A subsequent reduction of the energy supply corresponding to the second energy level can contribute to a manipulation safety and/or energy savings by still preserving the earpiece in its prepared state. In some implementations, the controller is configured to control the energy release unit to release the energy at the first energy level for a predetermined time interval. In some implementations, the predetermined time interval at the first energy level can account for the predetermined amount of energy to be supplied to the earpiece. In some implementations, the energy is released at the second energy level after the predetermined time interval.

In some implementations, the energy release unit is configured to release electromagnetic waves, in particular light and/or microwaves into the receiving chamber. In some implementations, the energy release unit is configured to provide a current and/or a magnetic field at the receiving chamber. In some implementations, the energy release unit is configured to release moisture into the receiving chamber. In some implementations, the energy release unit is configured to release mechanical stress into the receiving chamber. In some implementations, the energy release unit is configured to release thermal energy into the receiving chamber. In particular, the energy release unit can comprise a heating unit.

In some implementations, the controller is configured to control the energy release unit to release the thermal energy at a temperature value in a temperature range between 40° C. and 100° C., in particular between 40° C. and 90° C. Such a temperature range can account for a good preparation of various kinds of customizable earpieces. In some implementations, the controller is configured to control the heating unit to release the thermal energy at a first temperature and subsequently at a second temperature, wherein the first temperature has a larger value than the second temperature. In some implementations, the thermal energy at the first energy level is released at a temperature value above 70° C., in particular above 75° C. The thermal energy at the second energy level can be released at a temperature value below 70° C., in particular below 65° C. In some implementations, the thermal energy at the first energy level and the thermal energy at the second energy level differ by a temperature value of at least 5° C., preferably at least 10° C., and even more preferred at least 15° C.

In some implementations, the system for customizing an earpiece comprises an earpiece having a transition temperature between 30° C. and 90° C., in particular between 40° C. and 70° C. The earpiece can comprise a thermoplastic polymer and/or a shape memory material.

BRIEF DESCRIPTION OF THE DRAWINGS

Reference will now be made in detail to embodiments, examples of which are illustrated in the accompanying drawings. In the drawings.

DETAILED DESCRIPTION OF THE DRAWINGS

In the following detailed description, numerous specific details are set forth in order to provide a thorough understanding of the subject matter herein. However, it will be apparent to one of ordinary skill in the art that the subject matter may be practiced without these specific details. In other instances, well known methods, procedures, techniques, components, and systems have not been described in detail so as not to unnecessarily obscure features of the embodiments. In the following description, it should be understood that features of one embodiment may be used in combination with features from another embodiment where the features of the different embodiment are not incompatible. The ensuing description provides some embodiment(s) of the invention, and is not intended to limit the scope, applicability or configuration of the invention or inventions. Various changes may be made in the function and arrangement of elements without departing from the scope of the invention as set forth herein.

Figure 1:
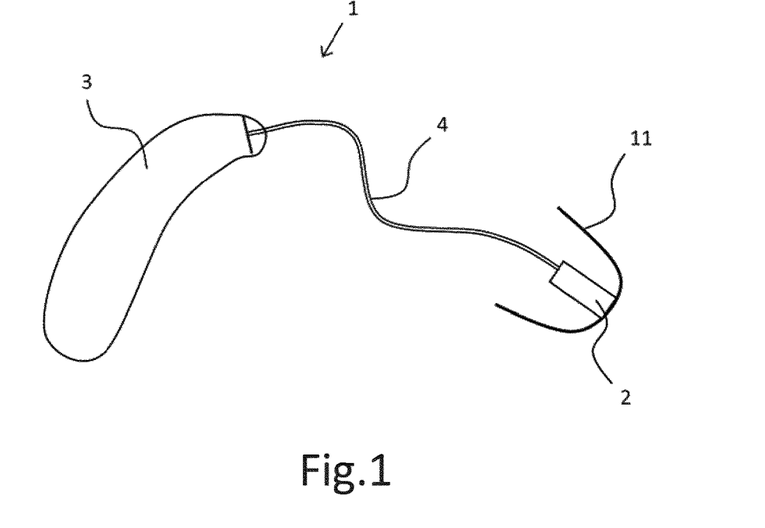
FIG. 1 schematically illustrates an earpiece connected to a hearing device, in accordance with some embodiments of the present disclosure.

FIG. 1 illustrates a hearing device 1 connected an earpiece 11 in accordance with some embodiments of the present disclosure. In the illustrated example, hearing device 1 is a receiver-in-the-canal (RIC) hearing aid. Earpiece 11 comprises a curved wall such that a cavity is surrounded by earpiece 11. Earpiece 11 has a dome-like shape. Hearing device 1 comprises an acoustic transducer 2 mounted to earpiece 11. Acoustic transducer 2 extends through a front portion of earpiece 11. Acoustic transducer 2 thus comprises a rear portion arranged inside the cavity surrounded by earpiece 11 and a front portion outside the cavity. Acoustic transducer 2 is a receiver. The receiver is configured to deliver sound into an ear canal when earpiece 11 is inserted into the ear canal. Hearing device 1 further comprises a housing 3 accommodating functional hearing device components. Housing 3 can be configured to be worn behind an ear of a user of hearing device 1. Acoustic transducer 2 and electrical components of hearing device 1 inside housing 3 are operatively interconnected. The interconnection is provided by a cable 4 between housing 3 and acoustic transducer 2.

Earpiece 11 at least partially comprises a transition material. The transition material allows earpiece 11 to transform from a first state into a second state after energy has been supplied to earpiece 11. Earpiece 11 is non-deformable in the first state during application of earpiece 11 at an ear. Earpiece 11 is deformable in the second state during application of the earpiece at an ear. Earpiece 11 can subsequently revert its state of rigidity from the second softer state, where it can adapt to the ear geometry, to the harder first state for a permanent fixation of the pre-formed geometry. In this way, earpiece 11 can be customized in-situ when applied at an ear. The transition material can be characterized by a transition energy. The first state can correspond to an energy state of the transition material below the transition energy and the second state can correspond to an energy state of the transition material above the transition energy. For instance, earpiece 11 can comprise at least one of the transition materials as disclosed in patent application No. PCT/EP2018/072428 and/or in publication Nos. WO 2018/099562 A1 and/or US 2017/0223444 A1. Earpiece 11 may also comprise at least one of the transition materials as disclosed in publication Nos. WO 2008/070986 A1 and/or WO 2017/184929 A1 and/or WO 2015/179975 A1. In particular, the transition material can be characterized by a transition temperature. The transition material can thus be selected such that earpiece 11 is in the first state below the transition temperature, and in the second state above the transition temperature. Below the transition temperature, earpiece 11 can thus be substantially non-deformable upon application at an ear, in particular such that earpiece 11 is not malleable below the transition temperature. Above the transition temperature, earpiece 11 can thus be deformable upon application at an ear, in particular such that earpiece 11 is malleable above the transition temperature. In particular, the transition material of earpiece 11 may comprise at least one thermoplastic material, in particular a thermoplastic polymer, and/or at least one shape memory material.

Figure 2:
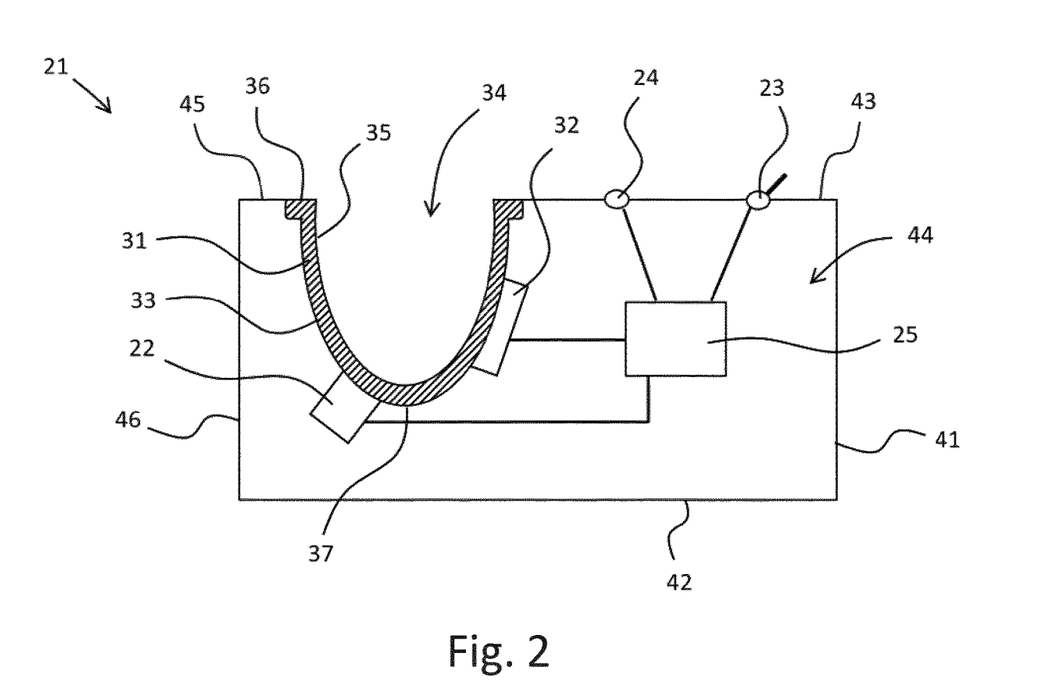
FIG. 2 schematically illustrates a device for preparing an earpiece for its customization, in accordance with some embodiments of the present disclosure.

FIG. 2 illustrates a device 21 for preparing an earpiece for its customization, in accordance with some embodiments of the present disclosure. Device 21 is configured to transfer energy to an earpiece. Device 21 comprises an energy release unit 31. Energy release unit 31 comprises an energy supply unit 32 and an energy release member 33. Energy release member 33 surrounds a receiving chamber 34 for receiving an earpiece. Receiving chamber 34 is delimited by an inner surface 35 of energy release member 33. Inner surface 35 is curved. Energy release member 33 has an open front end 36 exposing receiving chamber 34. An earpiece can thus be inserted into receiving chamber 34 through the opening at front end 36. A rear end 37 of energy release member 33 opposing front end 36 is closed. Inner surface 35 tapers from front end 36 to rear end 37. Inner surface 35 has a substantially dome-like shape, in particular a substantially parabolic shape.

Energy supply unit 32 is operatively connected to energy release member 33 such that an energy provided by energy supply unit 32 can be delivered to inner surface 35. In this way, the energy provided by energy supply unit 32 can be released into receiving chamber 34. The energy can thus be supplied to an earpiece, when the earpiece is inserted into receiving chamber 34. Inner surface 35 can form a contact surface for contacting the earpiece, when the earpiece is inserted into receiving chamber 34. In particular, inner surface 35 can have a shape substantially corresponding to at least a portion of an outer surface of an earpiece. In this way, the energy can be supplied effectively and homogeneously to the earpiece. Energy supply unit 32 is connected to an outer surface of energy release member 33. Energy supply unit 32 surrounds receiving chamber 34. Energy supply unit 32 comprises a heating element configured to provide thermal energy. Energy release member 33 comprises a heat conducting material, in particular a metal and/or a metallic alloy. Energy release member 33 thus forms a heat conducting body. In this way, thermal energy can be provided from energy supply unit 32 to energy release member 33 and released from inner surface 35 into receiving chamber 34. During the process, the temperature of energy release member 33 increases. The momentary temperature of energy release member 33 can thus indicate an amount of energy released into receiving chamber 34, in particular an amount of energy supplied to an earpiece inserted into receiving chamber 34.

Device 21 further comprises an energy detector 22. Energy detector 22 is configured to determine a quantity indicative for the energy released by energy release unit 31. Energy detector 22 is a temperature sensor. Temperature sensor 22 is configured to determine the momentary temperature of inner surface 35 of energy release member 33. In particular, temperature sensor 22 can comprise a temperature probe in contact with energy release member 33.

Device 21 further comprises a controller 25. Controller 25 is operatively connected to energy release unit 31, in particular to energy supply unit 32. Controller 25 is configured to control energy release unit 31. The energy releasing of energy release unit 31 can thus be controlled such that a predetermined amount of energy can be delivered to inner surface 35 of energy release member 33. In this way, a predetermined amount of energy can be released into receiving chamber 34, in particular supplied to an earpiece inserted into receiving chamber 34. Controller 25 is operatively connected to energy detector 22. Controller 25 is configured to receive values of the quantity indicative for the energy released by energy release unit 31 from energy detector 22. In particular, controller 25 can thus receive values of the momentary temperature of inner surface 35 of energy release member 33. Based on the received values, controller 25 is configured to control energy release unit 31 such that a predetermined temperature is provided at inner surface 35 of energy release member 33. In particular, controller 25 can be configured such that the thermal energy is released into receiving chamber 34 at a substantially constant energy level, at least for a predetermined time interval. Controller 25 can also be configured such that the thermal energy released into receiving chamber 34 is increased and/or decreased in between different energy levels. The momentary energy determined by energy detector 22 can thus be adjusted by controller 25 to the respective energy level.

Device 21 further comprises a user interface 23. User interface 23 is configured to detect a user interaction. In particular, user interface 23 can comprise a switch and/or a push button. Controller 25 is operatively connected to user interface 23. Controller 25 is configured to initiate the controlled energy releasing of energy release unit 31 after the user interaction has been detected by user interface 23. Device 21 further comprises an output interface 24. Output interface 24 is configured to output information indicative of at least one parameter related to the energy releasing by energy release unit 31. Controller 25 is operatively connected to output interface 24. Controller 25 is configured to initiate the outputting of the output information. In particular, the output information can comprise information about a momentary temperature of inner surface 35. The output information can comprise information about a time interval, in particular a predetermined time interval, in which a predetermined temperature value and/or a sequence of a plurality of predetermined temperature values of inner surface 35 has been maintained. The output information can comprise an indication whether a predetermined amount of energy, in particular thermal energy, has been released into receiving chamber 34 and/or supplied to an earpiece inserted into receiving chamber 34. Controller 25 can be configured to initiate outputting of the output information after determining that an elapsed time during which the energy has been released by energy release unit 31 has exceeded a predetermined time interval.

Device 21 further comprises a casing 41. Casing 41 comprises a base 42 and a cover 43. Casing 41 encloses an inner space 44 between base 42 and cover 43. Base 42 is configured to be positioned on a ground, in particular on a desk and/or a plane. Cover 43 comprises a top wall 45 and a lateral wall 46. Top wall 45 is in spaced relation to base 42. Top wall 45 extends substantially in parallel to base 42. Lateral wall 46 interconnects base 42 and top wall 42. Energy release unit 31 is provided in inner space 44. Controller 25 is provided in inner space 44. Energy detector 22 is provided in inner space 44. User interface 23 is provided on cover 43, in particular on top wall 45. Output interface 24 is provided on cover 43, in particular on top wall 45. Cover 43 comprises an opening. The opening extends through top wall 45. Energy release unit 31 is provided at the opening. In particular, front end 36 of energy release member 33 is mounted to cover 43 at the opening. The opening thus exposes receiving chamber 34. An earpiece is insertable into receiving chamber 34 through the opening of cover 43. Cover 43 is dimensioned such that it is portable by a user. Cover 43 is configured to provide a shielding of energy release unit 31 from an ambient environment outside inner space 44. In particular, cover 43 is configured to at least partially isolate the energy released from energy release unit 31 from an ambient environment outside inner space 44. Cover 43 can be formed from a plastic material.

Figure 3:
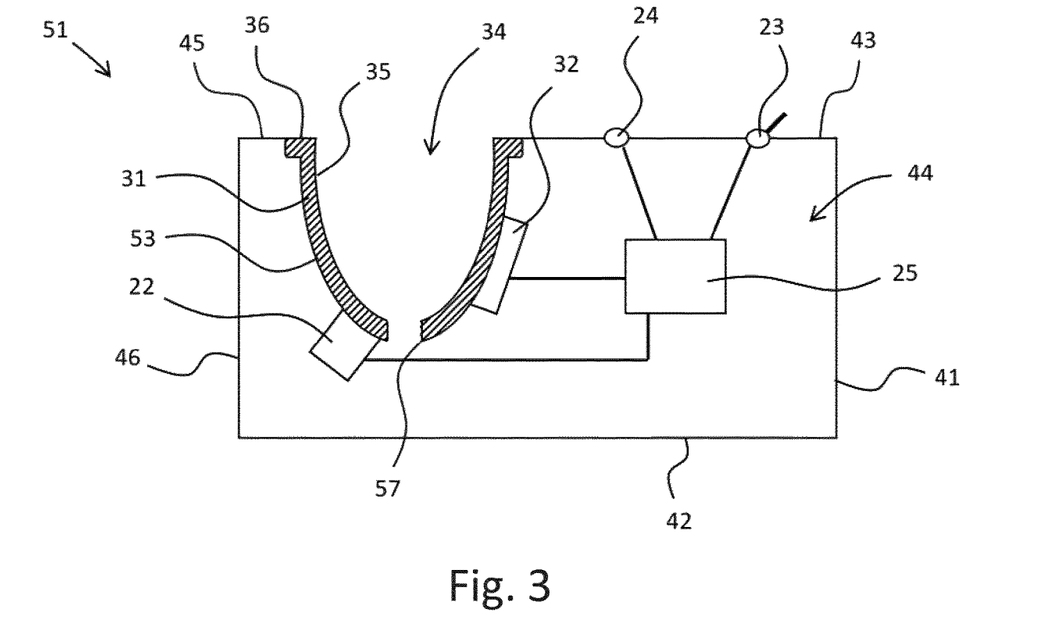
FIG. 3 schematically illustrates another device for preparing an earpiece for its customization, in accordance with some embodiments of the present disclosure.

FIG. 3 illustrates a device 51 for preparing an earpiece for its customization, in accordance with some embodiments of the present disclosure. Corresponding features with respect to previously described embodiments of device 21 are illustrated by the same reference numerals. Energy release unit 31 of device 51 comprises an energy release member 53 corresponding to energy release member 33 with the following exceptions. A rear end 57 of energy release member 53 opposing its front end 36 comprises a recess. The recess is provided at inner surface 35 of energy release member 53. The recess at rear end 57 faces the opening at front end 36. The recess at rear end 57 can define an area at which a reduced amount of energy released by energy release member 53 can be supplied to an earpiece inserted into receiving chamber.

An earpiece inserted into receiving chamber 34 can have a larger distance to inner surface 35 at a surface portion of the earpiece provided at the recess as compared to a surface portion of the earpiece provided at inner surface 35 at a distance from the recess. Thus, sensitive components of a hearing device integrated with the earpiece, for instance an acoustic transducer, can be provided at the recess. In this way, the sensitive component can be supplied with a smaller amount of energy released by energy release member 53 as compared to the remaining earpiece in order to protect the sensitive component. In particular, a portion of the earpiece comprising the sensitive component can be positioned at the recess and/or at least partially protrude into the recess when the earpiece is inserted into receiving chamber 34. The recess extends through energy release member 53 from inner surface 35 to an outer surface of energy release member 53. The recess thus forms a through-hole of energy release member 53 at rear end 57. The through-hole at rear end 57 opposes the opening at front end 36. Receiving chamber 34 delimited by inner surface 35 of energy release member 53 thus extends from the opening at front end 36 through the through-hole at rear end 57.

Figure 4:
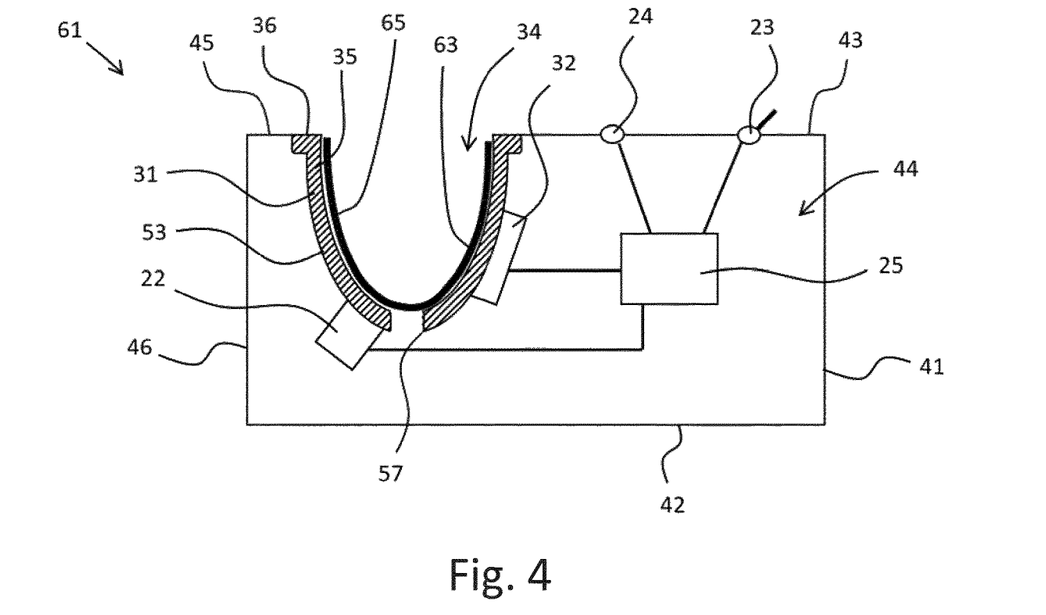
FIG. 4 schematically illustrates another device for preparing an earpiece for its customization, in accordance with some embodiments of the present disclosure.

FIG. 4 illustrates a device 61 for preparing an earpiece for its customization, in accordance with some embodiments of the present disclosure. Corresponding features with respect to previously described embodiments of devices 21, 51 are illustrated by the same reference numerals. An insert 63 is arranged at inner surface 35 of energy release member 53. Insert 63 has a shape substantially matching the shape of inner surface 35. Insert 63 has a substantially dome-like shape. An outer surface of insert 63 borders inner surface 35. An inner surface 65 of insert 63 delimits receiving chamber 34. Inner surface 65 can thus provide a contact surface for an earpiece inserted into receiving chamber 34. Insert 63 is configured such that energy released at inner surface 35 of energy release member 53 can be transmitted through insert 63 to inner surface 65 of insert 63. Insert 63 can be formed from a heat-conducting material and/or comprise a small thickness allowing heat-conduction through insert 63. Insert 63 can be formed, for instance, from a synthetic material and/or metallic material and/or organic material, in particular paper. The energy can thus be released from inner surface 65 of insert 63 into receiving chamber 34. In this way, the energy can be supplied to an earpiece inserted into receiving chamber 34.

Insert 63 can be manually inserted into energy release member 53. Insert 63 can be manually removed from energy release member 53. Removable insert 63 can thus provide a protective cover for an earpiece inserted into receiving chamber 34. Removable insert 63 can thus be used to account for hygiene standards during a customization preparation of the earpiece inside receiving chamber 34. In particular, removable insert 63 can be cleaned before the customization preparation of an earpiece inside receiving chamber 34. In particular, a different removable insert 63, for instance a disposable insert 63, can be used for each customization preparation of an earpiece inside receiving chamber 34.

Figure 5:
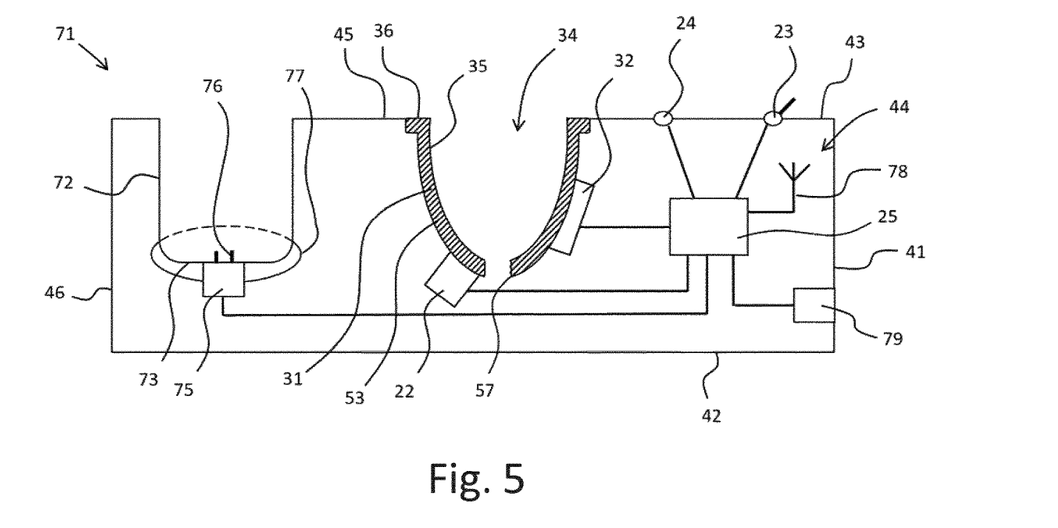
FIG. 5 schematically illustrates another device for preparing an earpiece for its customization, in accordance with some embodiments of the present disclosure.

FIG. 5 illustrates a device 71 for preparing an earpiece for its customization, in accordance with some embodiments of the present disclosure. Corresponding features with respect to previously described embodiments of devices 21, 51, 61 are illustrated by the same reference numerals. A deposition area 73 is provided on cover 43. Deposition area 73 is configured to support a hearing device. Deposition area 73 is provided in proximity to receiving chamber 34 such that an earpiece connected to the hearing device, in particular connected by a cable, can be inserted into receiving chamber 34 with the hearing device disposed at deposition area 73. In particular, a distance between deposition area 73 and a centre of the opening of cover 43 exposing receiving chamber 34 can be less than 20 cm, in particular less than 10 cm. Deposition area 73 is provided at an indentation 72 of cover 43. Indentation 72 is a deepened surface portion of top wall 45. Deposition area 73 has a smaller spacing relative to base 42 as compared to a surface portion of top wall 45 remote from deposition area 73. In this way, a rather stable placing of the hearing device on deposition area 73 can be provided.

Device 71 further comprises a charging port 75. Charging port 75 is provided in proximity to deposition area 73. Charging port 75 is configured to provide a connection for a hearing device at deposition area 73 to a power supply. Charging port 75 comprises a connector 76. Connector 76 is provided on deposition area 73. In this way, a hearing device can be plugged on connector 76 when positioned on deposition area 73. Thus, a power connection for the hearing device can be established via charging port 75 allowing a charging of the hearing device. Charging port 75 comprises an induction coil 77. Induction coil 77 surrounds at least a portion of deposition area 73 at which the hearing device can be disposed. Thus, a power connection for the hearing device can also be established via induction coil 77 allowing a charging of the hearing device, in particular a wireless charging. In this way, the hearing device can be charged by wired and/or wireless charging on deposition area 73. Controller 25 is operatively connected to charging port 75. Controller 25 can be configured to control the charging of the hearing device.

Device 71 further comprises a data port 78. Data port 78 is provided such that it is connectable to the hearing device at the deposition area. Data port 78 comprises an antenna for a wireless data connection to a corresponding data port of the hearing device. In particular, the data connection can be configured to comply with a Bluetooth protocol. Data port 78 is provided inside inner space 44. Controller 25 is operatively connected to data port 78. In this way, controller 25 can be configured to control a data exchange with the hearing device at deposition area 73.

Device 71 further comprises a power port 79. Power port 79 is configured to be connected to a power source. In particular, power port 79 can be configured to be connected to a power plug. In particular, power port 79 can be configured as a data port. For instance, power port 79 can be configured to be connected to an external device such as a computer. In this way, the external device can be configured for a data exchange with a hearing device at deposition area 73 via data port 78. Thus, power port 79 may be employed for data exchange with an external device and/or power supply from the external device. For instance, power port 79 can be a universal serial bus (USB). Controller 25 is operatively connected to power port 79. The power supplied via power port 79 can thus be distributed through controller 25 to at least one of energy detector 22, energy supply unit 32, charging port 75, and data port 78. Controller 25 can further be configured to control the power distribution, in particular at least the power distributed to energy supply unit 32. Controller 25 can further be configured to control a data exchange, in particular between a hearing device at deposition area 73 and/or data port 78 and/or an external device connected to power port 79 and/or energy detector 22.

Figure 6:
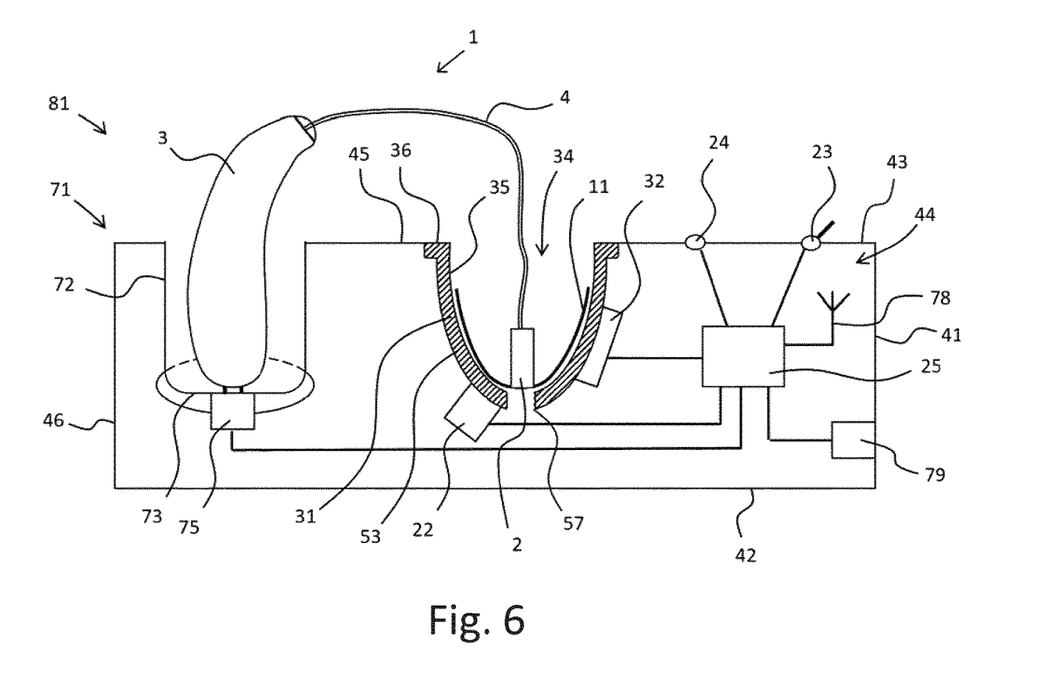
FIG. 6 schematically illustrates a system for customizing an earpiece comprising the earpiece illustrated in FIG. 1 and the device illustrated in FIG. 4.

FIG. 6 illustrates a system 81 for earpiece customization, in accordance with some embodiments of the present disclosure. Corresponding features with respect to previously described embodiments of hearing device 1, earpiece 11, and customization preparation devices 21, 51, 61, 71 are illustrated by the same reference numerals. System 81 comprises customization preparation device 71, hearing device 1, and earpiece 11. Hearing device 1 is disposed on deposition area 73 at cover 43. Hearing device 1 is plugged into charging port 75. At the same time, earpiece 11 is inserted into receiving chamber 34 of energy supply unit 32. In this way, simultaneous customization preparation of earpiece 11 and charging of hearing device 1 can be provided. Moreover, the multifunctionality of device 71 allows to reduce additional equipment needed for maintenance and/or adjustment of hearing device 1.

Earpiece 11 is provided in receiving chamber 34 such that it fits rather closely to contact surface 35 of energy release member 53. In this way, an efficient and homogeneous energy supply of the energy released at contact surface 35 to earpiece 11 can be achieved. Earpiece 11 is provided in receiving chamber 34 such that acoustic transducer 2 is positioned at the recess formed at rear end 57 of energy release member 53. In this way, the electric component can be spared from a direct exposure to the energy released at contact surface 35 during preparation of the customization of earpiece 11. Controller 25 is configured to control energy supply unit 32 depending on the thermal energy level of energy release member 53 determined by energy detector 22 in such a way that a predetermined amount of thermal energy can be released into receiving chamber 34. In this way, a predetermined amount of energy can be supplied to earpiece 11 inside receiving chamber 34. After supplying the predetermined amount of energy, earpiece 11 can be transformed from the first state, in which earpiece 11 is non-deformable during application at an ear, into the second state, in which earpiece 11 is deformable during application at an ear. After subsequent removing of earpiece 11 from receiving chamber 34, earpiece 11 can thus be customized in the second state by application of earpiece 11 at an ear.

Figure 7:
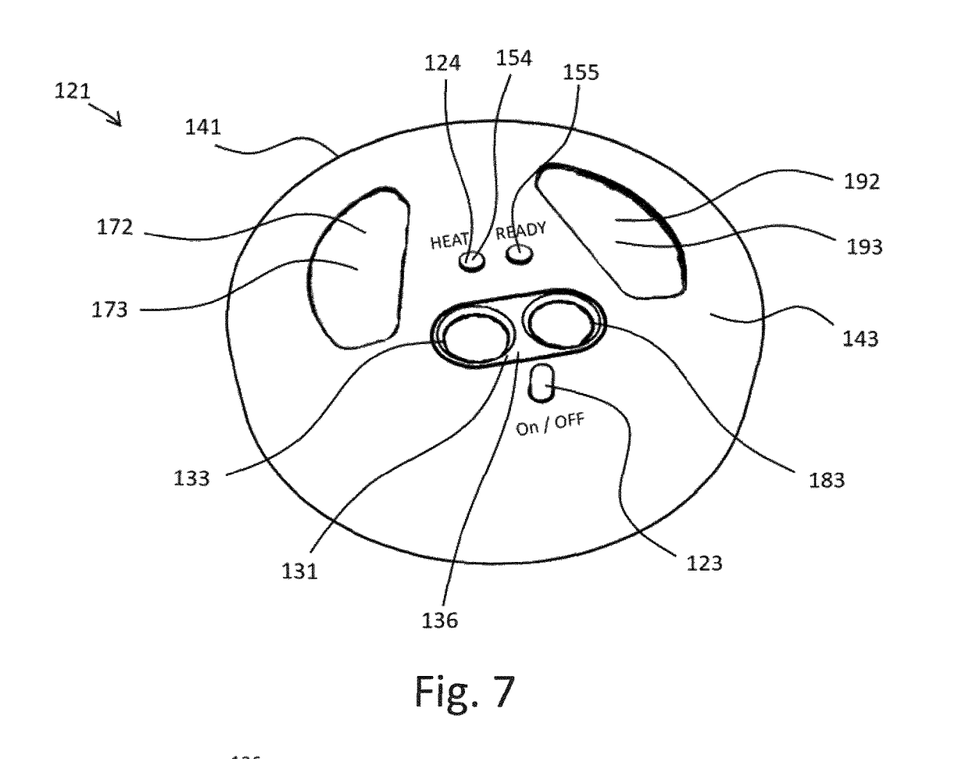
FIG. 7 schematically illustrates another device for preparing an earpiece for its customization, in accordance with some embodiments of the present disclosure.

FIG. 7 illustrates a device 121 for preparing an earpiece for its customization, in accordance with some embodiments of the present disclosure. Device 121 comprises a casing 141. Casing 141 comprises a base and a cover 143. Casing 141 is substantially disc-shaped. In particular, casing 141 has a substantially circular-cylindrical shape. A height of the cylinder is smaller than a diameter, in particular a radius, of a circular cross section of the cylinder. Such a shape can account for a rather easy portability of device 121. Two indentations 172, 192 are provided in cover 143, in particular at a top wall of cover 143. Indentations 172, 192 each define a deposition area 173, 193. Each deposition area 173, 193 is configured to support a respective hearing device. Indentations 172, 192 are spaced from one another. Indentations 172, 192 have a shape allowing a rather comfortable disposal and removal of the respective hearing device. Indentations 172, 192 are substantially kidney-shaped. Indentations 172, 192 are symmetrically arranged on cover 143. This can allow a rather comfortable handling of both hearing devices, in particular with two hands, during their placement on deposition areas 173, 193.

Cover 143 comprises an opening, in particular at the top wall. The opening is provided substantially in between indentations 172, 192. In this way, respective earpieces connected to the hearing devices positioned on deposition area 173, 193 can be rather comfortably inserted into the opening. An energy release unit 131 is provided in an inner space enclosed by casing 141 between its base and cover 143. Energy release unit 131 is positioned at the opening of cover 143. A front end 136 of energy release unit 131 provided at the opening of cover 143 comprises two openings. Energy release unit 131 comprises two energy release members 133, 183. Energy release members 133, 183 lead each to one of the openings at front end 136 of energy release unit 131. The respective positions of deposition areas 173, 193 relative to energy release members 133, 183 can allow an unproblematic insertion of an earpiece connected to a hearing device located on one of deposition areas 173, 193 into one respective energy release member 133, 183, and removal therefrom. A user interface 123 is provided on cover 143, in particular on the top wall of cover 143. User interface 123 comprises a push button. User interface 123 is operatively connected to a controller. An output interface 124 is provided on cover 143, in particular on the top wall. Output interface 124 comprises a first light emitting diode (LED) 154 and a second LED 155. Output interface 124 is operatively connected to the controller. In some implementations, device 121 can comprise any other feature of at least one of devices 21, 51, 61, 71 as described above. In some implementations, device 121 can be correspondingly applied in a system 81 as described above.

After determining a user interaction at user interface 123, the controller is configured to initiate energy releasing of energy release unit 131 by both energy release members 133, 183. The controller is configured to control a predetermined amount of energy released by energy release members 133, 183. In this way, a predetermined amount of energy can be supplied to a respective earpiece inserted inside energy release members 133, 183. During the process, the controller is configured to control output interface 124 such that first LED 154 is emitting light and that second LED 155 is not emitting light. After the controller has determined that the predetermined amount of energy has been released by energy release members 133, 183, the controller is configured to control output interface 124 such that second LED 155 is also emitting light. Output interface 124 is thus configured to output information indicative of said energy releasing by energy release unit 131. The output indicates whether a predetermined amount of energy has been supplied to the respective earpiece inside energy release members 133, 183. In particular, the controller can be configured to initiate the outputting after determining that an elapsed time during which the energy has been released by energy release unit 131 has exceeded a predetermined time interval. This can indicate to a user that the earpieces are prepared for customization. The earpieces can thus be removed from energy release members 133, 183 and can be each applied at an ear for their customization. After determining another user interaction at user interface 123, the controller is configured to stop energy releasing of energy release unit 131. The controller can then be configured to control output interface 124 such neither first LED 154 nor second LED 155 is emitting light.

Figure 8A:
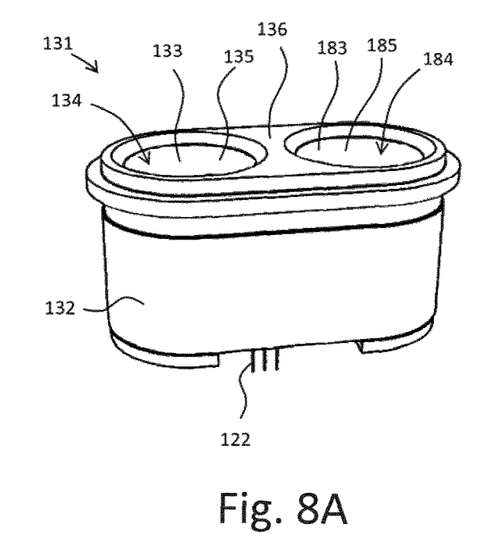
FIGS. 8A, B schematically illustrate an energy release unit of the device illustrated in FIG. 6.
Figure 8B:
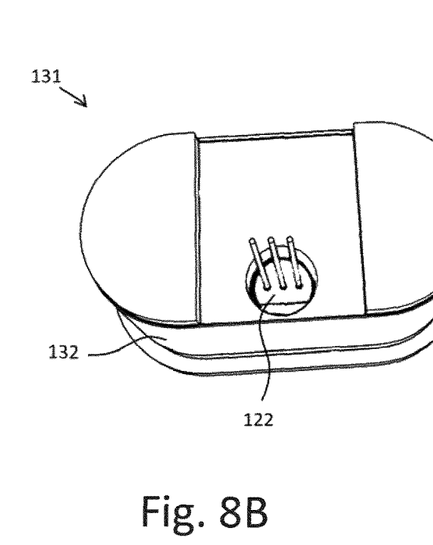

FIGS. 8A and 8B illustrate energy release unit 131 of device 121 in greater detail, in accordance with some embodiments of the present disclosure. Energy release unit 131 has a substantially cylindrical shape. A cross section of the cylinder comprises two opposing rectilinear edges and two opposing curved edges, in particular semi-circular edges. Energy release members 133, 183 each comprise an inner wall 135, 185. Inner walls 135, 185 each delimit a respective receiving chamber 134, 184. An earpiece is insertable into each receiving chamber 134, 184. In some implementations, receiving chambers 134, 184 have a substantially cylindrical shape, in particular a circular cylindrical shape. In some implementations, receiving chambers 134, 184 have a substantially dome-like shape. Each of inner walls 135, 185 can provide a contact surface for an earpiece inserted into receiving chamber 134, 184.

Energy release members 133, 183 are integrated with an energy release body. Energy release body 133, 183 comprises a heat conducting material, in particular a metallic material such as a metal and/or a metal alloy. A shape of energy release body 133, 183 substantially corresponds to the above described shape of energy release unit 131. Energy release unit 131 further comprises an energy supply unit 132. Energy supply unit 132 is provided at an outer surface of energy release body 133, 183. Energy supply unit 132 surrounds receiving chambers 134, 184 provided in energy release members 133, 183. In particular, energy supply unit 132 comprises a resistive heating foil. Heating foil 132 is wrapped around energy release body 133, 183. Energy supply unit 132 is thus configured to provide thermal energy to energy release body 133, 183. Energy release members 133, 183 are configured to transmit the thermal energy to their inner wall 135, 185. The thermal energy can thus be released from inner wall 135, 185 into receiving chamber 134, 184. An energy detector 122 is provided at energy release body 133, 183. Energy release body 133, 183 comprises an opening in which energy detector 122 is inserted. Energy detector 122 is in contact with energy release body 133, 183. Energy detector 122 is a temperature sensor configured to determine a momentary temperature of energy release body 133, 183.

Figure 9A:
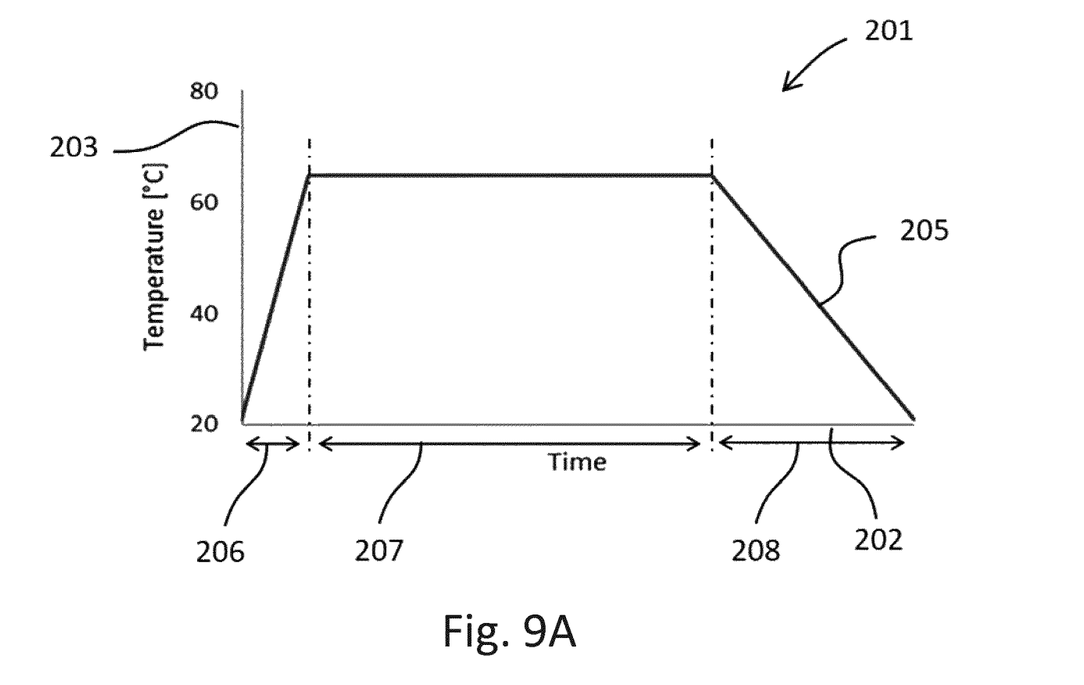
FIGS. 9A, B illustrate functional plots of a temperature evolving over time, the temperature corresponding to a thermal energy released by a device for preparing an earpiece for its customization, in accordance with some embodiments of the present disclosure.
Figure 9B:
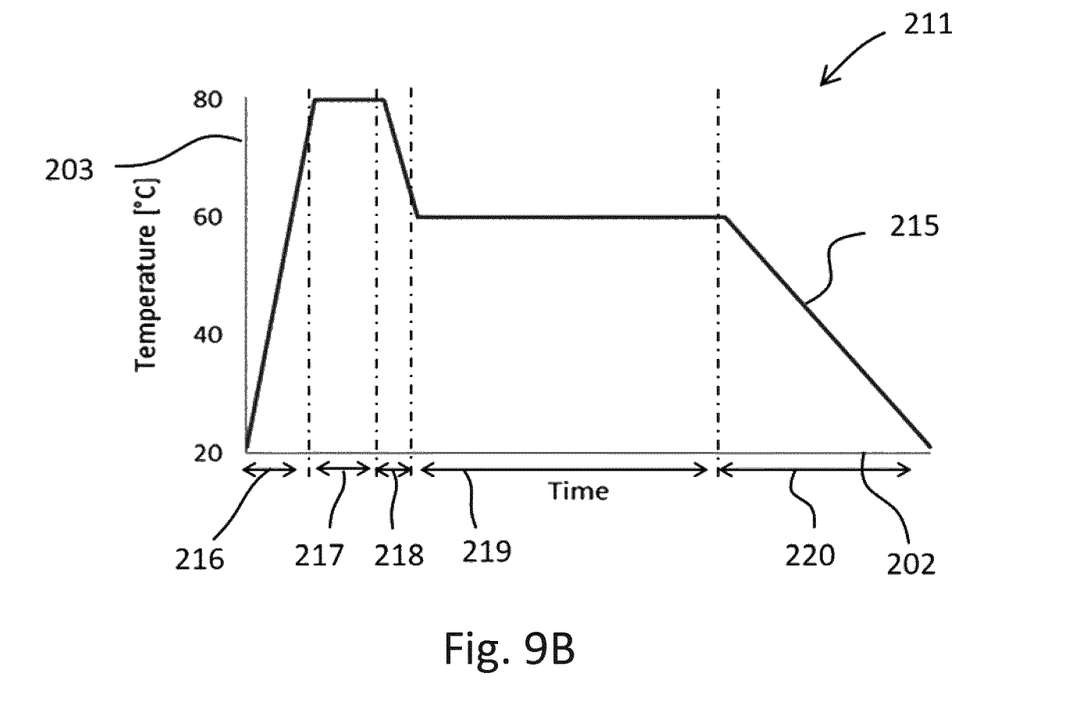

FIGS. 9A and 9B illustrate functional plots 201, 211 of a respective temperature profile 205, 215 evolving over time. The time is indicated on an axis of abscissas 202. The temperature is indicated on an axis of ordinates 203. Each of functional plots 201, 211 illustrates a method of preparing an earpiece for its customization, in accordance with some embodiments of the present disclosure. Each of functional plots 201, 211 further illustrates a method of supplying energy to an earpiece, in accordance with some embodiments of the present disclosure. Controller 25 of any of devices 21, 51, 61, 71 and/or the controller of device 121 can be configured to control at least one of these methods. The temperature, as indicated on axis of ordinates 203, can correspond to an energy value determined by energy detector 22, 122. The temperature, as indicated on axis of ordinates 203, can correspond to an amount of energy released by energy release unit 31, 131 and/or an amount of energy supplied to an earpiece inside receiving chamber 34, 134, 184. The temperature, as indicated on axis of ordinates 203, can correspond to a predetermined amount of energy controlled by the controller to be released by energy release unit 31, 131 and/or a predetermined amount of energy controlled by the controller to be supplied to an earpiece inside receiving chamber 34, 134, 184. The temperature is illustrated in units of degree Celsius. An energy value corresponding to this temperature may be calculated by converting the temperature in units of Kelvin and multiplying by Boltzmann's constant k. The time, as indicated on axis of abscissas 202, can comprise a time interval during which the controller is configured to control the amount of energy released by energy release unit 31, 131 and/or the amount of energy supplied to an earpiece inside receiving chamber 34, 134, 184.

FIG. 9A illustrates functional plot 201 of first temperature profile 205. After inserting an earpiece into receiving chamber 34, 134, 184, the temperature is increased from room temperature to a temperature of 60° during a first time interval 206. The temperature value is above a transition temperature of the earpiece such that the earpiece can transform from a first state, in which the earpiece is non-deformable upon application at an ear, to a second state, in which the earpiece is deformable upon application at an ear. The temperature can be determined by energy detector 22, 122. After the temperature is reached, the temperature is kept at the value of 60° for a second time interval 207. The controller is configured to control the energy releasing of energy release unit 31, 131 such that the temperature is kept at this value. Momentary fluctuations of the temperature value are indicated to the controller by energy detector 22, 122 such that the controller can control energy supply unit 32, 123 in a manner such that the temperature can be substantially kept at this value. Second time interval 207 comprises a minimum time determined by the controller to be required to supply the predetermined amount of energy to the earpiece. After the minimum time interval, the controller can be configured to output via output interface 24, 124 to a user that the earpiece is readily prepared for its customization at an ear. Second time interval 207 can also be longer than this minimum time interval, in particular if the user decides to not yet remove the earpiece from receiving chamber 34, 134, 184 in order to customize the earpiece at an ear, such that the earpiece stays readily prepared inside receiving chamber 34, 134, 184 in its customizable state. In this way, the earpiece can be provided in the customizable second state until the user is ready to perform the customization. After second time interval 207, the temperature is decreased again to room temperature during a third time interval 208.

FIG. 9B illustrates functional plot 211 of second temperature profile 215. After inserting an earpiece into receiving chamber 34, 134, 184, the temperature is increased from room temperature to 80° during a first time interval 216. After the temperature is reached, as indicated to the controller by energy detector 22, 122, the temperature is kept at the value of 80° for a second time interval 217. The higher temperature value of 80° can provide an increased energy transfer to the earpiece such that a shorter time interval is required to supply a predetermined amount of energy to the earpiece. In this way, the preparation time can be reduced. Moreover, a more effective energy transfer can be provided to the earpiece during the first time interval such that the customizable state of the earpiece can be reached homogeneously and securely. Second time interval 217 is a predetermined time interval. A predetermined amount of energy corresponding to the temperature value of 80° can thus be supplied to the earpiece during second time interval 217. After second time interval 217, the controller is configured to decrease the temperature to a value of 60° during a third time interval 218. After the decreased temperature is reached, as indicated to the controller by energy detector 22, 122, the temperature is kept at the value of 60° during a fourth time interval 219. The controller can then be configured to output via output interface 24, 124 that the earpiece is readily prepared for its customization at an ear. The lower temperature value of 60° can allow to keep the earpiece in the customizable state in which it has been transferred during second time interval 217. The lower temperature can provide the earpiece in a condition in which it is more safe and/or convenient to handle during removal from receiving chamber 34, 134, 184. In addition, the earpiece can also be more securely applied at an ear for its customization at the lower temperature. The earpiece can be provided in the customizable second state during fourth time interval 219 until the user is ready to perform the customization, in particular to remove the earpiece from receiving chamber 34, 134, 184.

After fourth time interval 219, the temperature is decreased again to room temperature in a fifth time interval 220.

While the principles of the disclosure have been described above in connection with specific devices and methods, it is to be clearly understood that this description is made only by way of example and not as limitation on the scope of the invention. The above described preferred embodiments are intended to illustrate the principles of the invention, but not to limit the scope of the invention. Various other embodiments and modifications to those preferred embodiments may be made by those skilled in the art without departing from the scope of the present invention that is solely defined by the claims.

The invention claimed is:

1. A device for preparing an earpiece for its customization, the device including an energy release unit comprising a receiving chamber for receiving the earpiece and configured to release energy into the receiving chamber, characterized by:
    a controller configured to control said energy releasing of the energy release unit such that a predetermined amount of energy can be supplied to the earpiece inside the receiving chamber;
    a contact wall for contacting the earpiece, wherein the contact wall at least partially delimits the receiving chamber; and
    a removable insert configured to be inserted into the energy release unit, wherein the contact wall is provided on the insert and the energy can be released by the energy release unit through the insert.

2. The device according to claim 1, characterized by a casing including a base and a cover, the casing enclosing an inner space between the base and the cover, wherein the energy release unit is provided in the inner space.

3. The device according to claim 2, characterized in that the cover comprises an opening exposing the receiving chamber such that the earpiece is insertable into the receiving chamber through the opening of the cover.

4. The device according to claim 2, characterized by a deposition area configured to support a hearing device, the deposition area provided on the cover.

5. The device according to claim 4, characterized by a charging port for the hearing device, the charging port configured to provide a connection to a power supply for the hearing device at the deposition area.

6. The device according to claim 4, characterized by a data port for the hearing device, the data port provided such that it is connectable to the hearing device at the deposition area.

7. The device according to claim 2, characterized in that the casing is portable by a user.

8. The device according to claim 1, characterized by a user interface configured to detect a user interaction, the controller configured to initiate said controlling of said energy releasing after the user interaction has been detected.

9. The device according to claim 1, characterized by an output interface configured to output information indicative of at least one parameter related to said energy releasing by the energy release unit.

10. The device according to claim 9, characterized in that the controller is configured to initiate outputting of said information by the output interface after determining that an elapsed time during which the energy has been released by the energy release unit has exceeded a predetermined time interval.

11. The device according to claim 1, characterized by an energy detector configured to determine a quantity indicative for the energy released by the energy release unit.

12. The device according to claim 11, characterized in that the energy detector comprises a temperature sensor.

13. The device according to claim 1, characterized in that the receiving chamber is a first receiving chamber for receiving a first earpiece and the energy release unit comprises a second receiving chamber for receiving a second earpiece.

14. The device according to claim 1, characterized in that the predetermined amount of energy is selected such that the earpiece can be transformed from a first state into a second state inside the receiving chamber, wherein the earpiece is non-deformable in the first state and deformable in the second state during application of the earpiece at an ear.

15. The device according to claim 1, characterized in that the controller is configured to control said energy releasing such that energy at a substantially constant energy level is released into the receiving chamber at least for a predetermined time interval.

16. The device according to claim 1, characterized in that the energy release unit is configured to release thermal energy into the receiving chamber.

17. The device according to claim 16, characterized in that the controller is configured to control the energy release unit to release the thermal energy at a temperature value in a temperature range between 40° C. and 100° C.

18. A system for customizing an earpiece comprising the earpiece and the device according to claim 1, the earpiece configured to transform from a first state into a second state after energy has been supplied to the earpiece, wherein the earpiece is non-deformable in the first state and deformable in the second state during application of the earpiece at an ear.

19. A device for preparing an earpiece for its customization, the device including an energy release unit comprising:
a first receiving chamber for receiving a first earpiece;
second receiving chamber for receiving a second earpiece;
wherein the energy release unit is configured to release energy into the first and second receiving chambers, and
wherein the device further comprises a controller configured to control said energy releasing of the energy release unit such that a predetermined amount of energy can be supplied to the first and second earpieces inside the first and second receiving chambers.

* * * * *